(12) United States Patent
Rabinovich et al.

(10) Patent No.: US 7,407,634 B2
(45) Date of Patent: *Aug. 5, 2008

(54) PLASMATRON FUEL CONVERTER HAVING DECOUPLED AIR FLOW CONTROL

(75) Inventors: Alexander Rabinovich, Swampscott, MA (US); Nicolai Alexeev, Moscow (RU); Leslie Bromberg, Sharon, MA (US); Daniel R. Cohn, Chestnut Hill, MA (US); Andrei Samokhin, Moscow (RU)

(73) Assignee: Massachusetts Institute of Technology, Cambridge, MA (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/411,917

(22) Filed: Apr. 11, 2003

(65) Prior Publication Data

US 2004/0202592 A1    Oct. 14, 2004

(51) Int. Cl.
*B01J 19/08* (2006.01)
(52) U.S. Cl. .................. 422/186.04; 422/186.22; 422/186.25; 123/3; 204/164
(58) Field of Classification Search ............ 422/186.04, 422/18.22, 186.28, 186.25; 123/3; 204/164
See application file for complete search history.

(56) References Cited

U.S. PATENT DOCUMENTS

| | | | |
|---|---|---|---|
| 2,787,730 A | 4/1957 | Berghaus et al. | 315/111 |
| 3,018,409 A | 1/1962 | Berghaus et al. | 315/111 |
| 3,035,205 A | 5/1962 | Berghaus et al. | 315/111 |
| 3,423,562 A | 1/1969 | Jones et al. | 219/121 |
| 3,649,195 A | 3/1972 | Cook et al. | 23/209.4 |
| 3,879,680 A | 4/1975 | Naismith et al. | 331/94.5 |
| 3,992,277 A | 11/1976 | Trieschmann et al. | 204/172 |
| 4,059,416 A | 11/1977 | Matovich | 48/197 |
| 4,339,546 A | 7/1982 | Randalls | 518/704 |
| 4,625,681 A | 12/1986 | Sutekiyo | 123/3 |
| 4,830,492 A | 5/1989 | Ko | 356/313 |
| 4,963,792 A | 10/1990 | Parker | 315/58 |

(Continued)

FOREIGN PATENT DOCUMENTS

EP    0 423 370    4/1991

(Continued)

OTHER PUBLICATIONS

PCT International Search Report for PCT/US04/08441 filed Mar. 19, 2004.

*Primary Examiner*—Kishor Mayekar
(74) *Attorney, Agent, or Firm*—Choate Hall and Stewart LLP

(57) ABSTRACT

A novel apparatus and method is disclosed for a plasmatron fuel converter ("plasmatron") that efficiently uses electrical energy to produce hydrogen rich gas. The plasmatron has multiple decoupled gas flow apertures or channels for performing multiple functions including fuel atomization, wall protection, plasma shaping, and downstream mixing. In one aspect, the invention is a plasmatron fuel converter comprising a first electrode and a second electrode separated from the first electrode by an electrical insulator and disposed to create a gap with respect to the first electrode so as to form a discharge region adapted to receive a reactive mixture. A power supply is connected to the first and second electrodes and adapted to provide voltage and current sufficient to generate a plasma discharge within the discharge region. Fluid flows are established in the vicinity of the plasma discharge region by multiple decoupled flow establishing means.

37 Claims, 6 Drawing Sheets

U.S. PATENT DOCUMENTS

| | | | |
|---|---|---|---|
| 4,967,118 A | 10/1990 | Urataki et al. | 315/56 |
| 5,095,247 A | 3/1992 | Hanamura | 315/111.21 |
| 5,138,959 A | 8/1992 | Kulkarni | 110/346 |
| 5,425,332 A | 6/1995 | Rabinovich et al. | 123/3 |
| 5,437,250 A | 8/1995 | Rabinovich et al. | 123/3 |
| 5,560,890 A | 10/1996 | Berman et al. | 422/186.04 |
| 5,653,895 A | 8/1997 | Shintani | 219/121.5 |
| 5,887,554 A | 3/1999 | Cohn et al. | 123/3 |
| 6,012,326 A | 1/2000 | Raybone et al. | 422/186.21 |
| 6,284,157 B1 | 9/2001 | Eliasson et al. | 252/373 |
| 6,322,757 B1 * | 11/2001 | Cohn et al. | 422/186.04 |
| 6,702,991 B1 * | 3/2004 | Smaling et al. | 422/186.21 |
| 6,881,386 B2 * | 4/2005 | Rabinovich et al. | 422/186.04 |
| 2003/0221949 A1 | 12/2003 | Rabinovich et al. | 204/164 |

FOREIGN PATENT DOCUMENTS

| | | |
|---|---|---|
| EP | 0 605 010 | 7/1994 |
| WO | WO 01/14698 A1 * | 3/2001 |
| WO | WO 01/33056 | 5/2001 |

* cited by examiner

PLASMATRON FUEL CONVERTER HAVING DECOUPLED AIR FLOW CONTROL

FIELD OF THE INVENTION

The present invention relates to the field of fuel reforming technology and more particularly to a method and apparatus for a plasmatron fuel converter having decoupled air flow control.

BACKGROUND OF THE INVENTION

Plasmatron fuel converters reform hydrocarbons to generate a hydrogen rich gas through the use of plasma discharges. (See, for example, U.S. Pat. Nos. 6,322,757 and 5,887,554, the teachings of which are incorporated herein by reference). Two general types of plasma discharge regimes can be distinguished by their electrical characteristics and their modes of operation. A non-arcing discharge regime operates at high voltage and low currents, while an arc discharge regime operates at low voltage and high currents. (For a general treatise, see J. Reece Roth, Industrial Plasma Engineering, Vol. 1 and 2, Institute of Physics: Bristol, UK, 1995).

Thermal arc plasmatrons have received particular attention in the prior art. (See, for example, U.S. Pat. Nos. 5,425,332 and 5,437,250, the teachings of which are incorporated herein by reference). Generally, thermal arc plasmatrons operate at low voltage and high current and have less efficient electrical energy to chemical energy conversion ratios than non-arcing discharge plasmatrons. In addition, non-arcing discharge plasmatrons also reduce electrode erosion as a result of utilizing lower currents. Non-arcing discharges are usually produced at sub-atmospheric pressures, typically less than about 20 Torr. When pressure is increased, the non-arcing discharge rapidly transitions to an arc discharge. Low pressure gas glow discharges and apparatus for their production are known. (See, for example, U.S. Pat. Nos. 2,787,730; 3,018,409; 3,035,205; 3,423,562; 4,830,492; 4,963,792; and 4,967,118, the teachings of which are incorporated herein by reference).

There is therefore a need for a plasmatron that produces discharges in the non-arcing regime in a substantially continuous manner with enhanced flow control mechanisms for improved operation.

SUMMARY OF THE INVENTION

A novel apparatus and method is disclosed for a plasmatron fuel converter ("plasmatron") that efficiently uses electrical energy to produce hydrogen rich gas. The plasmatron has multiple decoupled gas flow apertures or channels for performing multiple functions including fuel atomization, wall protection, plasma shaping, and downstream mixing.

In one aspect, the invention is a plasmatron fuel converter comprising a first electrode and a second electrode separated from the first electrode by an electrical insulator and disposed to create a gap with respect to the first electrode so as to form a discharge region adapted to receive a reactive mixture. A power supply is connected to the first and second electrodes and adapted to provide voltage and current sufficient to generate a plasma discharge within the discharge region. Fluid flows are established in the vicinity of the plasma discharge region by multiple decoupled flow establishing means.

In another aspect, the invention provides a method of plasma fuel conversion, comprising the steps of: positioning a first electrode and a second electrode such that a gap exists between them and a plasma discharge region is formed; injecting a reactive mixture into said discharge region; supplying power from a power supply so as to provide voltage and current sufficient to generate a plasma discharge within the discharge region and produce an ignited reactive mixture; and introducing at least two fluid flows in addition to said injected reactive mixture into a vicinity of said plasma discharge region, wherein said at least two fluid flows have decoupled flow control.

BRIEF DESCRIPTION OF THE DRAWING

The invention is described with reference to the several figures of the drawing, in which.

DETAILED DESCRIPTION OF THE PREFERRED EMBODIMENTS

Figure 1:
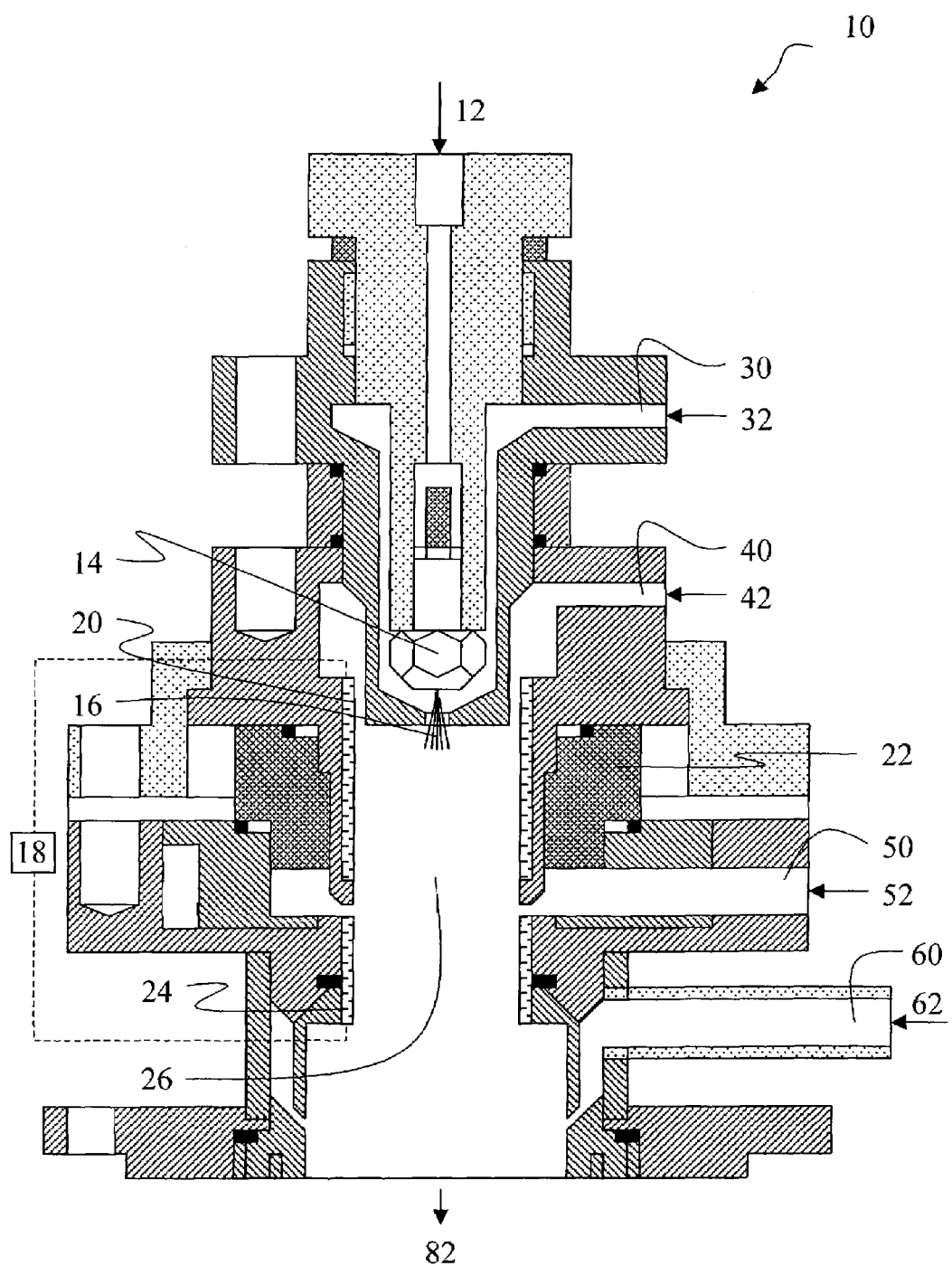
FIG. 1 is a cross-sectional view of a plasmatron fuel converter having multiple decoupled gas intake apertures according to one embodiment of the invention.

Robust, large volume plasma discharges are needed for fast start-up of low current, low power plasmatron fuel converters ("plasmatrons") and for efficient operation after start-up. Rapid establishment, extinction and reestablishment of the plasma discharges, combined with initiation of persistent chemical reactions by the flux of active species generated by the discharge, result in a quasi-continuous plasma discharge. The quasi-continuous plasma discharge effectively fills the discharge region and initiates chemical reactions throughout that volume. The use of electrical energy by the plasmatron to promote hydrogen producing reactions is determined, in part, by the ratio of the period of operation in the non-arcing discharge regime to the total period of plasma discharge during an average cycle of operation. Thus, the plasmatron of this invention can operate in a substantially continuous manner in the non-arc discharge regime.

Efficient plasmatron operation is enabled by the efficient use of the electrical energy to promote chemical reactions in a given discharge region and volumetric efficiency in the percentage of chemical conversion achieved in the volume of bulk reactant fluid. Efficiency is further enhanced by reducing degradation of the plasmatron, such as that caused by soot formation and electrode surface wear. Efficient operation and plasmatron protection have been achieved by the present invention through the use of multiple decoupled gas flow apertures providing gas flows to perform multiple functions in the vicinity of a plasma discharge region.

One application of plasmatrons involves partial oxidation of hydrocarbon fuels to produce hydrogen-rich fuels for use in internal combustion systems such as gasoline or diesel engines and their associated exhaust systems. Such plasmatrons may be selected for operation between stoichiometric partial oxidation and full combustion depending on conditions and applications. During full combustion, the output of the plasmatron is a hot gas that is no longer hydrogen-rich. Power for operation of the plasmatron will preferably be provided by components of the internal combustion system.

Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

FIG. 1 is a cross-sectional view of a plasmatron fuel converter 10 having multiple decoupled gas apertures according to one embodiment of the invention. The term "decoupled" refers to the independently controlled intake and flow operations of gas flowing through multiple apertures of the plasmatron 10. The plasmatron 10 is comprised of a structure housing a top cylindrical electrode 20 and a bottom cylindrical electrode 24 separated by an electrical insulator 22. In a preferred embodiment, fuel 12 is atomized and introduced as a reactive mixture 16 from a nozzle 14 at the center of the top electrode 20. Fuel atomization can be achieved by appropriate nozzle 14 design with or without air assist. Fuel 12 may comprise liquid fuel, gaseous fuel, or vaporized fuel. When operating with liquid hydrocarbons, fuel deposition and condensation on the inner surfaces of electrodes 20, 24 may be reduced by employing the nozzle 14 to produce a narrow jet of fuel droplets. Spray angles between 15 and 30 degrees have been shown to be sufficient.

The electrodes 20, 24 are axially aligned with the longitudinal axis of the plasmatron 10 allowing for a gap in between them to form a plasma discharge region 26. In one embodiment the diameter of the plasma discharge region 26 is approximately 0.85 inches and the length is approximately 1.25 inches. The plasma discharge is established by supplying, via a power supply 18, high voltage (300 V to 60 kV; and resulting current in the range of approximately 10 milliamperes to 2 amperes) in the discharge region 26 between electrodes 20, 24. Whether in thermodynamic equilibrium or non-equilibrium, the low current non-arcing discharge is eventually elongated to the point of extinction due to current limitation, voltage limitation or geometric plasma instability.

Generally, the plasmatron will provide average power to the plasma in range of between 10 and 1000 watts. The electrical power consumption is generally between 0.3% to 10% of the thermal power content of hydrogen-rich gas 82 produced by the plasmatron. The cycle frequency necessary to provide a quasi-uniform plasma discharge can be provided by the selection of various electrical and fluid dynamic characteristics of the plasmatron. The power supply frequency is adjusted in the range of 100 Hz to 2 MHz. By controlling the electrical and thermodynamic parameters of the plasma, the operation of this plasmatron fuel converter can be selected for high energy conversion efficiency and for selectivity in the chemical processes initiated by the volumetric ignition. In a preferred embodiment of the invention, such selectivity is for the production of hydrogen-rich gas from hydrocarbon fuel.

After extinction, the plasma discharge is reestablished almost instantaneously along a different pathway between two random points on the electrodes 20, 24. The plasma discharge is generally reestablished in a time of less than 100 nanoseconds. Depending on the selections of various operational parameters of the plasmatron, this process occurs naturally at a high frequency of plasma discharge initiation and extinction and provides quasi-uniform plasma discharge throughout the entire volume of the discharge region. The frequency of plasma discharge initiation and extinction is here termed 'cycle frequency'. Natural cycle frequency for a plasmatron fuel converter of the illustrated preferred embodiment will typically be on the order of several kHz (1-10 kHz).

The plasmatron 10 has multiple separate gas intake apertures. Hereinafter, the term "air" will be used to refer to any gas suitable for use with a plasmatron according to the present invention. It should be noted that in other embodiments, it is also contemplated that fuel and fuel/air mixtures can be injected via the multiple decoupled apertures. In the embodiment shown, one aperture 30 is for atomization air 32 that serves to provide the air assist for the atomization process of the fuel 12 to produce the injected reactive mixture 16. A second aperture 40 provides wall protection air 42 that allows an air stream to flow down the sides of the plasma discharge region. A third aperture 50 provides the plasma shaping air 52 that is used to stretch and move the discharge in the plasma discharge region 26. A fourth aperture 60 provides air 62 injected downstream from the plasma discharge region that mixes the ignited fuel/air mixture. The result of the operation of the present invention is the efficient production of a hydrogen-rich gas 82. The functions of the apertures and decoupled air flows will now be further described.

The fuel atomization air flow 32 provides air assist to the nozzle 14 so as to atomize the injected fuel 12. Fuel atomization provides for uniform mixing of the fuel within the injected air/fuel mixture 16.

The wall protection air flow 42 provides a gas blanket protecting the surface of the electrodes from operational wear and reducing deposition of fuel on the electrodes. Amelioration of the problems of electrode surface wear and fuel deposition improves the efficiency of the operation of the plasmatron.

The plasma shaping air flow 52 provides air that shapes and moves the plasma discharge within the plasma discharge region 26. Decoupling of the air flow rate of the plasma shaping air flow 52 from the overall air flow rate allows the plasma shaping air flow to be used additionally to create turbulent air flows within the plasma discharge region 26.

The downstream mixing air flow 62 provides downstream air injected into the ignited fuel/air mixture. This additional air can correct the required oxygen/carbon (O/C) of the ignited fuel mixture (for example, close to stoichiometric partial oxidation, O/C~1). Additionally, the downstream air creates turbulence in the ignited fuel/air mixture (either axial, radial, tangential, or any combination thereof) that creates a uniform mixture and speeds the chemical reaction kinetics. The one or more downstream mixing channels 60 can be oriented in at any angle of declination to perform the desired mixing function. In one embodiment, the downstream mixing apertures have a diameter of 0.1 inches at the site of injection into the vicinity of the plasma discharge region 26. In another embodiment, the downstream mixing fluid flow may include air flows, fuel flows and fuel/air mixture flows.

The multiple decoupled gas apertures and corresponding air flows are used to perform a number of functions for improving efficiency and protecting the plasmatron. FIG. 1 illustrates one embodiment of aperture positioning; however, other embodiments will be known to those of ordinary skill in the art. For example, for each function performed, multiple apertures can be utilized. In the cylindrical configuration of the plasma discharge region shown, multiple apertures can be radially aligned around the axis of the cylinder. Additionally, multiple downstream mixing flow apertures may be utilized to provide multiple downstream fluid flows that include air, fuel, and fuel/air mixtures.

In a preferred embodiment, the flow rates of the fuel atomization air 32, wall protection air 42, plasma shaping air 52, and downstream air 62 are decoupled from the overall air flow rate of the plasmatron system and may be each controlled independently. The air flow rates are preferably set to provide improved conditions for discharge and protection of the plasmatron. Such conditions include filling up the volume in the plasmatron to provide improved ignition by providing intimate contact between the microdischarges and the fuel/air mixture. At lower flow rates of the plasma shaping air, the discharge is moving slowly and not filling the volume. At flow rates higher than optimal, the discharge tends to stay close to the wall leaving a dark space in the center. Other conditions to enhance operation include reducing fuel deposition on electrodes, reducing electrode surface wear, and increased turbulence in the injected fuel/air reactive mixture, the plasma discharge, and the ignited fuel/air mixture, which can be affected by corresponding adjustment of decoupled air flow rates.

Preferred flow rates of the air flows depend in part on the electrode geometry, axial flow rate, and power supply parameters. For an electrode gap of 2 mm, and an inner diameter of the electrodes of 12-25 mm, a preferred flow rate of the plasma shaping gas is 2 g/s (100 slpm). Under these conditions, it is possible to obtain good reforming at an O/C ratio of 1.06, with a power consumption of 500 W, a fuel power conversion efficiency (heating value of reformate over heating value of fuel) of 82-85%, a hydrogen yield of 80%, and at a fuel flow rate of 0.5-1.0 g/s without soot production. The electrical power level in the plasmatron discharge is 100 W-600 W. A typical distance between nozzle and gap is 12-30 mm. For best performance, the fuel injection nozzle should be electrically neutral, to minimize the possibility of arcing to the nozzle. Air flow rates for the other apertures may be set to match the rate of air flow for the plasma shaping air or can be independently controlled depending on desired conditions. For example, the downstream air flow rate can be adjusted to alter the downstream turbulence as desired, and/or the wall protection air flow rate can be modified depending on observed degradation of the electrode surfaces.

It is also possible to optimize the geometry of the fuel injection for maximum interaction (contact) with the plasma discharge. If the distance between the fuel injection and the plasma discharge is too long, the fuel may strike the walls of the electrode prior to ignition. If the distance is too short, the residence time of the fuel in the discharge region is too small, or the fuel is concentrated near the axis of the device, resulting in poor ignition.

Figure 2:
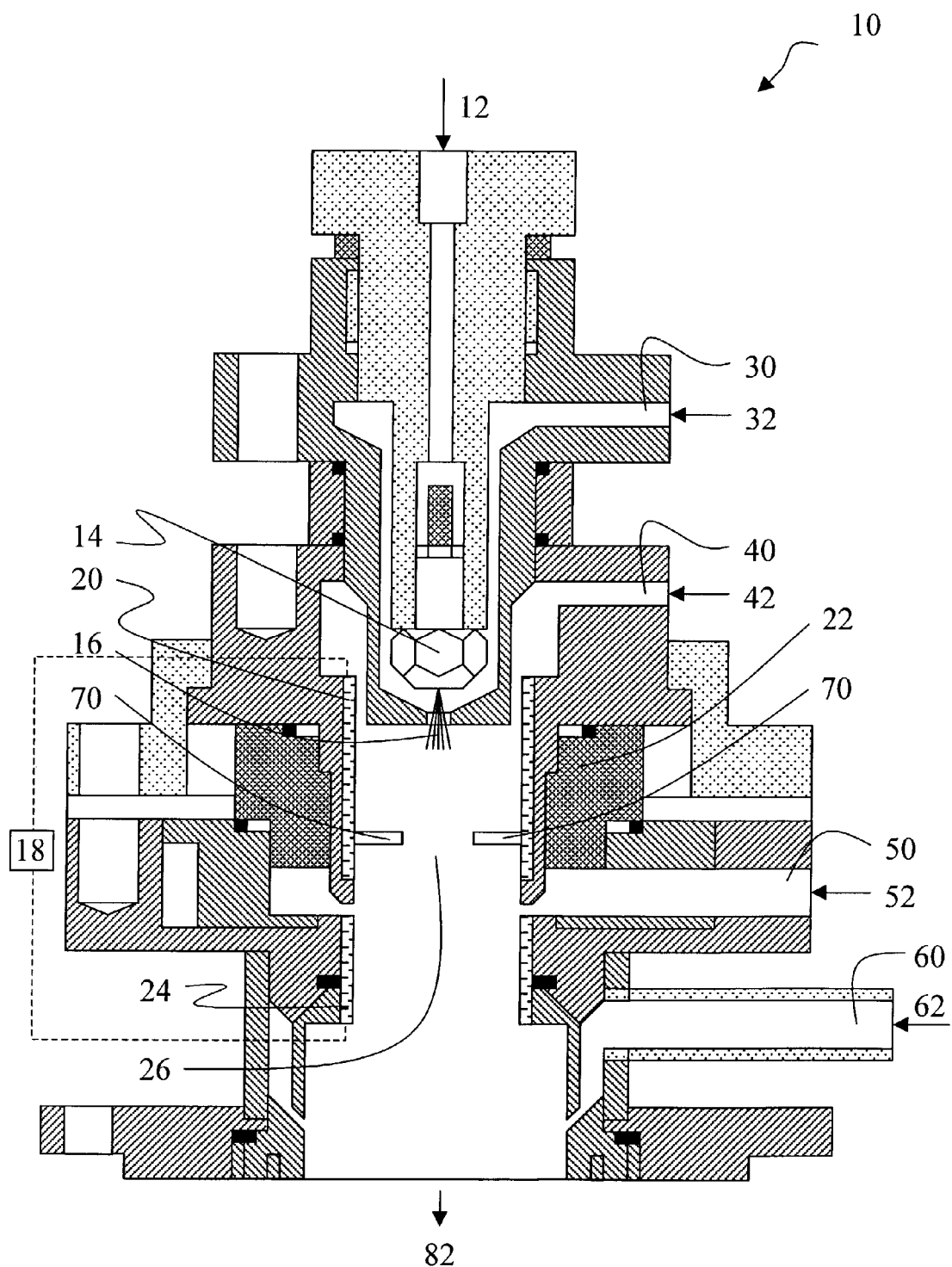
FIG. 2 is a cross-sectional view of a plasmatron fuel converter having a diaphragm positioned within a plasma discharge region according to one embodiment of the invention.

In another embodiment, as shown in FIG. 2, the mixing and atomizing of the fuel can be improved through the use of a diaphragm 70 positioned downstream from but close to the nozzle 14. The purpose of this diaphragm 70 is to redirect the wall protection air 42 from mainly axial flow to radially inward flow, towards the fuel/air mixture stream 16. The turbulence thus produced achieves excellent mixing of the fuel/air mixture. This prepared mixture is better suited for ignition by the downstream discharge in the plasma discharge region 26. An advantage of this embodiment is that it allows for a substantial increase in the overall flow rate, thus allowing the plasmatron to generate increased amounts of hydrogen rich gas 82.

By careful selection of the operating parameters of the air flows 32, 42, 52, 62 and the fuel 12, the conditions for enhanced and even optimal fuel reforming chemical reactions are achieved. The air-fuel ratio, and thus the O/C ratio, can be varied from as low as an O/C ratio=1 to as high as an O/C ratio=2 for liquid hydrocarbon fuels with a composition of $(CH_2)_n$, and preferably the O/C ratio will be in the range of 1.0 to 1.2. The volumetric ignition feature of the present application is very useful in achieving high volumetric efficiencies and high electrical efficiencies under conditions of reduced chemical reaction persistence and/or propagation. Such conditions occur in very fuel rich environments characteristic of partial oxidation reformation of hydrocarbon fuel, where chemical initiation at any individual site in the discharge region is difficult to initiate and maintain because of very slow 'flame' propagation speed.

Figure 3:
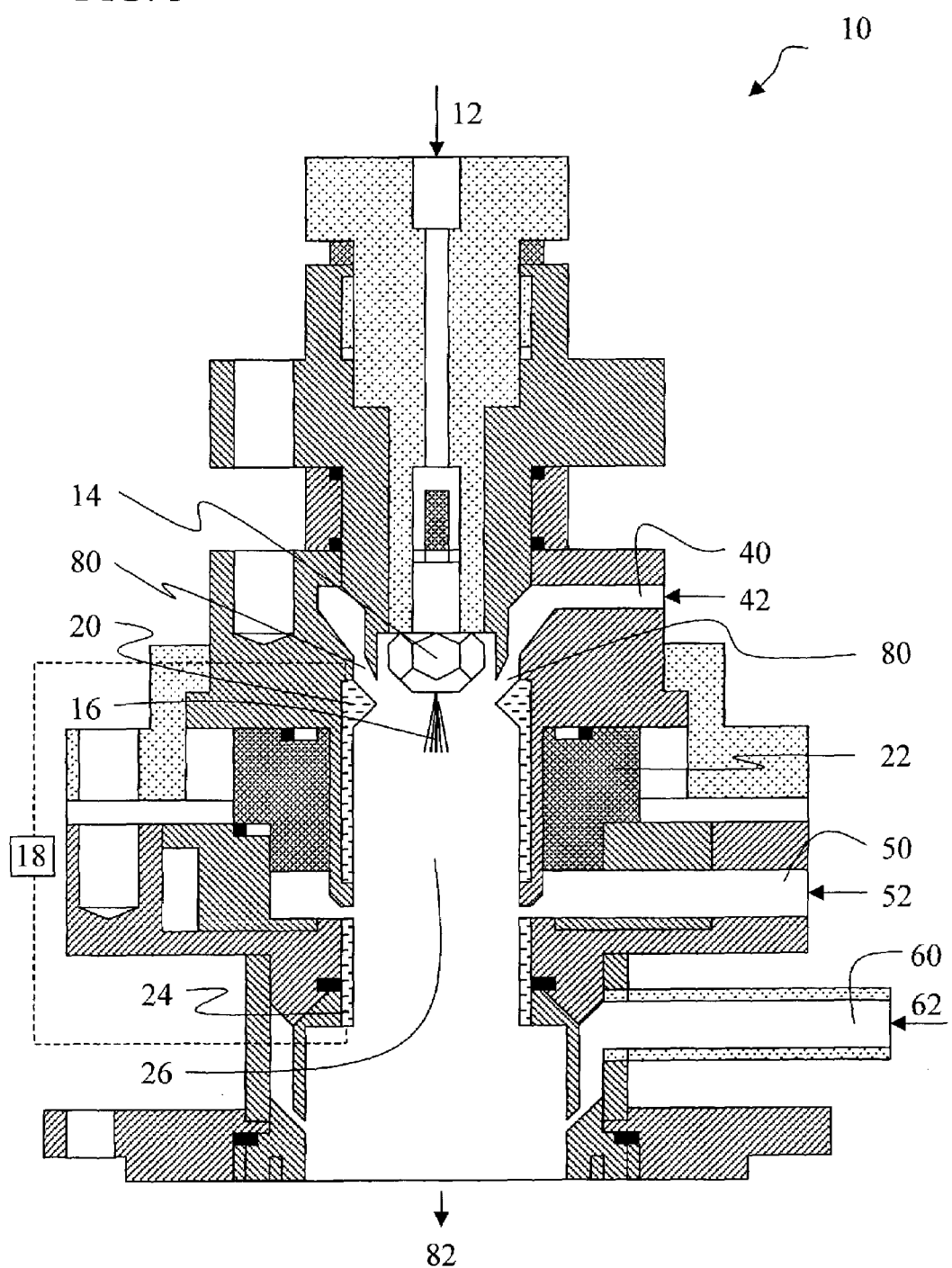
FIG. 3 is a cross-sectional view of a plasmatron fuel converter wherein wall protection air is diverted to aid in preparing the fuel/air mixture according to one embodiment of the invention.

In another embodiment, the fuel atomization aperture 30 and wall protection air aperture 40 may be combined to provide for one flow that serves to control the spray angle of the nozzle and provides wall protection functions. FIG. 3 is a cross-sectional view of a plasmatron wherein a portion of the wall protection air 42 is diverted to aid in preparing the fuel/air mixture 16. The atomization air aperture is eliminated, its function being replaced by redirected wall protection air 42 flowing through aperture 40. Channels 80 for redirecting the wall protection air 42 allow some of the flowing air to flow down the sides of the plasma discharge region 26 while some of the flowing air is used as air assist for fuel atomization.

To produce fine atomization of liquid fuels, and good uniform mixing, it is advantageous to use low pressure air assist with a pneumatic nozzle. The low pressure air cools down the nozzle and decreases the spray angle. In order to achieve fuel flow rate control, it is beneficial to use pulsed control (fuel flow control by adjusting valve open duty cycle). This allows fuel control while maintaining constant fuel pressure, as is the case in vehicles today. If a pulsed injector is used to introduce fuel directly into the plasmatron discharge region, the fuel/air composition is far from homogeneous, and soot formation occurs. Improved atomization can be achieved by using pneumatic nozzles; however, pneumatic nozzles have the disadvantage that they operate properly at very limited flow rate ranges.

Figure 4:
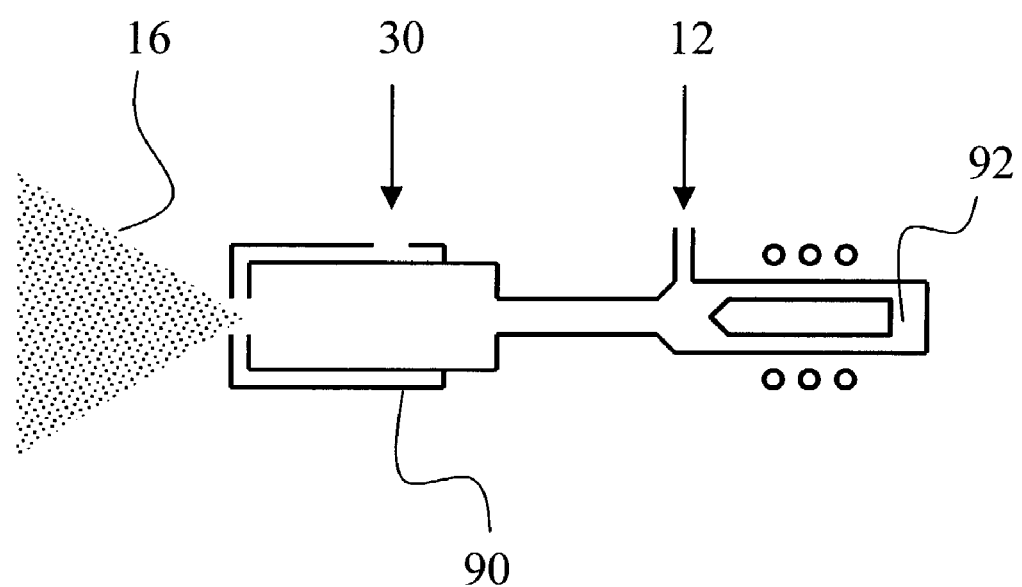
FIG. 4 is a schematic view showing the combination of a pneumatic nozzle with a pulse solenoidal valve for fuel injection control according to one embodiment of the invention.

FIG. 4 is a schematic view showing the combination of a pneumatic nozzle 90 utilizing atomization air 32 intake with a pulse solenoidal valve 92 for control of the fuel 12 intake. The pneumatic nozzle 90 produces a constant fuel/air mixture 16 flow despite the pulsing flow rate of the fuel 12. By combining the pneumatic nozzle 90 with the pulse solenoidal valve 92 (for fuel control), it is possible to obtain good fuel atomization in a wide range of fuel flow rates.

In order to flow the air through the plasmatron, a pressure gradient is formed across the plasmatron. One method to produce a pressure gradient is to compress the air through the use of a compressor or turbine, for example, as found in an automobile engine. Another method involves using an engine-produced vacuum. Although operation with hydrogen will decrease the throttling required by the engine, it is likely that there may still be some throttling. In this case, the vacuum can be used to produce the required flow.

Figure 5:
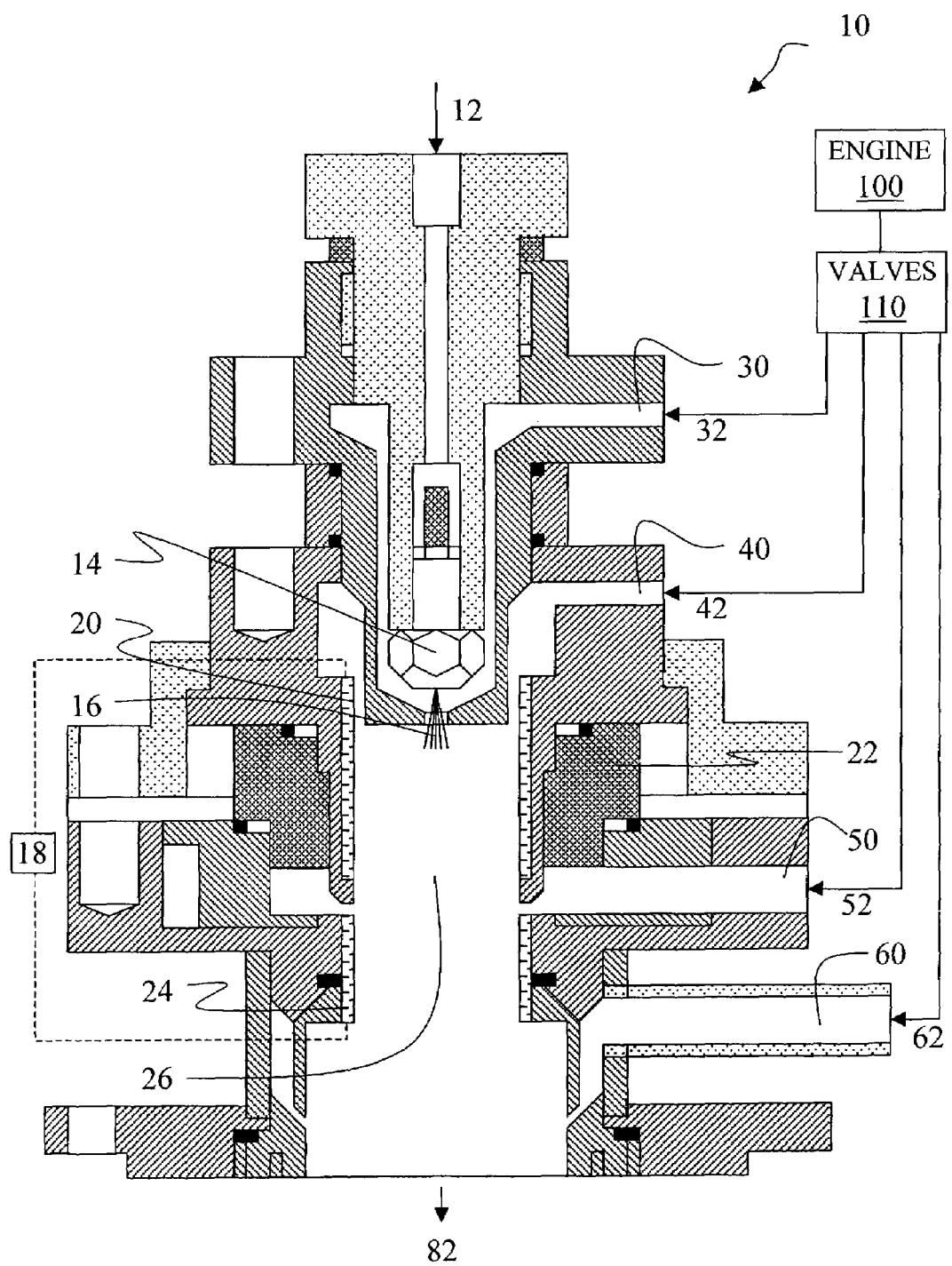
FIG. 5 is a schematic view showing the utilization of a valve system controlling decoupled air flows to multiple intake apertures according to one embodiment of the invention.

Further, it is possible to adjust one or more valves or controllers upstream from the plasmatron to control the air flow rate provided to the plasmatron and the multiple decoupled gas flow apertures, independent of engine condition. FIG. 5 is a schematic view showing the utilization of a valve system controlling decoupled air flows independent of engine condition to multiple intake apertures according to one embodiment of the invention. An engine 100 provides a pressurized air source. The pressurized air flows through a control system of valves 110 that may control delivery and decoupling of air flows 32, 42, 52 and 62 to the intake apertures 30, 40, 50 and 60. The present invention allows for the operation of the system at a low pressure, for example at around 6 psi, which is achievable by a compressor or turbine within the engine 100. The valve system 110 and/or the designs and dimensions of the multiple intake apertures 30, 40, 50 and 60 provide air flows that are decoupled from the overall operational pressure of the plasmatron, and hence provide enhanced control of the plasmatron system.

In another embodiment, multiple stage ignition of the injected reactive air/fuel mixture 16 can be utilized. In the first stage, ignition of air/fuel mixtures at a first O/C ratio is followed by secondary injection of a mixture with a different O/C ratio. In a preferred embodiment, a first stage mixture has an O/C ratio substantially higher than 1 (for stoichiometric partial oxidation), followed by a mixture with O/C smaller or close to 1, so that the overall O/C ratio is close to 1. One goal of this embodiment is to create a flow rate with very high temperature reaction products that can be used to ignite the secondary mixture of air/fuel. The flow rate through the first stage could be substantially smaller than flow rates of injection downstream.

In another embodiment, the first stage serves as an air preheater, by combusting a small fraction of the fuel, with O/C ratio higher than 1, and then injecting additional air to result in elevated air temperature. Additional fuel is injected into the hot gas for rapid vaporization of the fuel. The total mixture is then ignited by the plasmatron. The air in the first stage may be electrically preheated to make ignition of the fuel/air mixture in the first stage more robust. Only a very small volume of air needs to be preheated, reducing the required electrical power. Another embodiment is to have the O/C ratio close to pyrolysis in the first stage to minimize the peak temperatures of the product gases. Additional air and fuel can then be injected downstream from the ignition by other flow injection apertures.

For efficient operation of the plasmatron, following ignition in the discharge region, the fuel/air stream ignited by the plasma discharge can be introduced downstream into a reactor for the production of hydrogen-rich gas. The plasmatron reactor includes two regions, a homogeneous zone without a catalyst, and a heterogeneous region with a catalyst. In the homogeneous region, initial conversion of the fuel/air mixture occurs, with complete reduction of all oxygen. In this manner, the absence of free oxygen in the heterogeneous region avoids generation of hot spots in the catalysts and subsequent deterioration of the catalyst. The O/C ratio of the homogeneous region could be monitored through temperature measurement, as well as monitoring the air and/or fuel flow rates.

For further improved efficiency, the energy consumption of the plasmatron may be decreased by using a heat exchanger to preheat the air flows, the fuel, and the fuel/air mixture. The heat exchanger allows for decreasing the temperature of the hydrogen-rich gas injected into an engine's inlet manifold. Also, by preheating, it is possible to decrease the power of the plasmatron necessary to reform the fuel at a given fuel flow rate. Alternatively at a constant level of plasmatron power the heat exchanger makes it possible to reform a higher flow rate of fuel.

Additionally, to further decrease the start up time, part of the hot hydrogen rich gas reformate output from the plasmatron can be recirculated back into the plasmatron, and potentially premixed with any of the air flows. Hydrogen rich gas recirculation increases the ease of the reforming operation, due to the much greater volumetric ignition rate ('flame speed') of the hydrogen. In this configuration, the equilibrium of the reformate is not changed, but the kinetics of the partial oxidation reaction could be dramatically increased. The hot recirculated hydrogen rich gas 82 can also help in quickly raising the temperature needed for start-up.

It is desirable to be able to operate the plasmatron fuel converter at varying throughputs of hydrogen-rich gas. In addition, in order to obtain the highest efficiency, it is desirable to operate the plasmatron fuel converter with an oxygen to carbon ratio O/C close to 1 (stoichiometric for partial oxidation). In one embodiment, in order for the plasmatron fuel converter to produce hydrogen-rich gas with an O/C ratio close to 1 in a broad range of fuel flow rates, the plasmatron should operate in the following way. To obtain appropriate atomization of the liquid hydrocarbon fuel (gasoline, diesel, etc), a constant atomization air flow should be maintained. The wall protection air flow and tangential plasma shaping air flow are then decreased monotonically to decrease the fuel flow rate, in such a way that the total O/C ratio is maintained close to 1. The longer residence times due to lower flow rates balance the inhomogeneous distribution of the plasma in the volume, which is a direct result of decreased plasma shaping air. With decreased velocities due to smaller flow rate, the contact time of air-fuel mixture with the discharge is still significant to provide good conditions for fuel ignition.

The variation of wall protection and plasma shaping air flows and maintaining atomization air flow constant could provide production of hydrogen rich gas at O/C~1 without any soot formation. Dynamic ranges have been demonstrated from 10 to 40 kW thermal power of the reformate in our experiments.

In another embodiment, a voltage transformer may be incorporated into the plasmatron. This integration can be achieved by miniaturization of the transformer, possibly by the use of RF frequencies. The use of the high voltage transformer close to the plasmatron allows for increased safety by removing high voltage from everywhere except internal to the plasmatron and for decreased electromagnetic radiation (EMI) which could interfere with other electrical systems. By operating at higher frequencies, it is possible to decrease the size of the transformer substantially, with the cross sectional area of the transformer scaling approximately inversely with the frequency, and the size of the transformer scaling strongly with the frequency.

In another embodiment, a plasmatron fuel converter according to the present invention may be configured to allow for the efficient reformation of other liquid fuels, such as diesel fuel. Diesel fuel is harder to reform than gasoline because of the higher viscosity and evaporation characteristics of the fuel. In this embodiment, it is possible to obtain efficient reforming of diesel and other hard-to-reform liquid fuels at an O/C ratio close to stoichiometry for partial oxidation (O/C~1) without noticeable soot formation. The steps to achieve this goal are: (1) effectively atomize the liquid fuel to droplet sizes on the order of 10-30 microns in diameter; and (2) provide sufficient power density in order to ignite the air/fuel mixture.

The first step for effectively atomizing the fuel can be provided by proper design of a nozzle with decreased orifice diameter, for example, from 2.5 mm (~100 mils) used for the case of the gasoline plasmatron to 1.25 mm (~50 mils) for the case of hard-to-reform liquid fuels. In addition, atomization is further improved by air assist atomization including increased air pressure and associate air velocities (from 5-10 psi in the case of the gasoline plasmatron to ~50 psi in the case of hard-to-reform liquid fuels).

The second step is achieved by decreasing the inner diameter of the plasmatron electrodes, for example, from 21.8 mm (0.86 in) for the case of the gasoline plasmatron to 10.2 mm (0.4 in) for the case of hard-to-reform liquid fuels. In addition, the distance from the electrode gap and the end of the bottom electrode is decreased. Since the electrical power level and the air/fuel flow rates are comparable to the gasoline plasmatron, the decreased volume results in increased power density.

Figure 6:
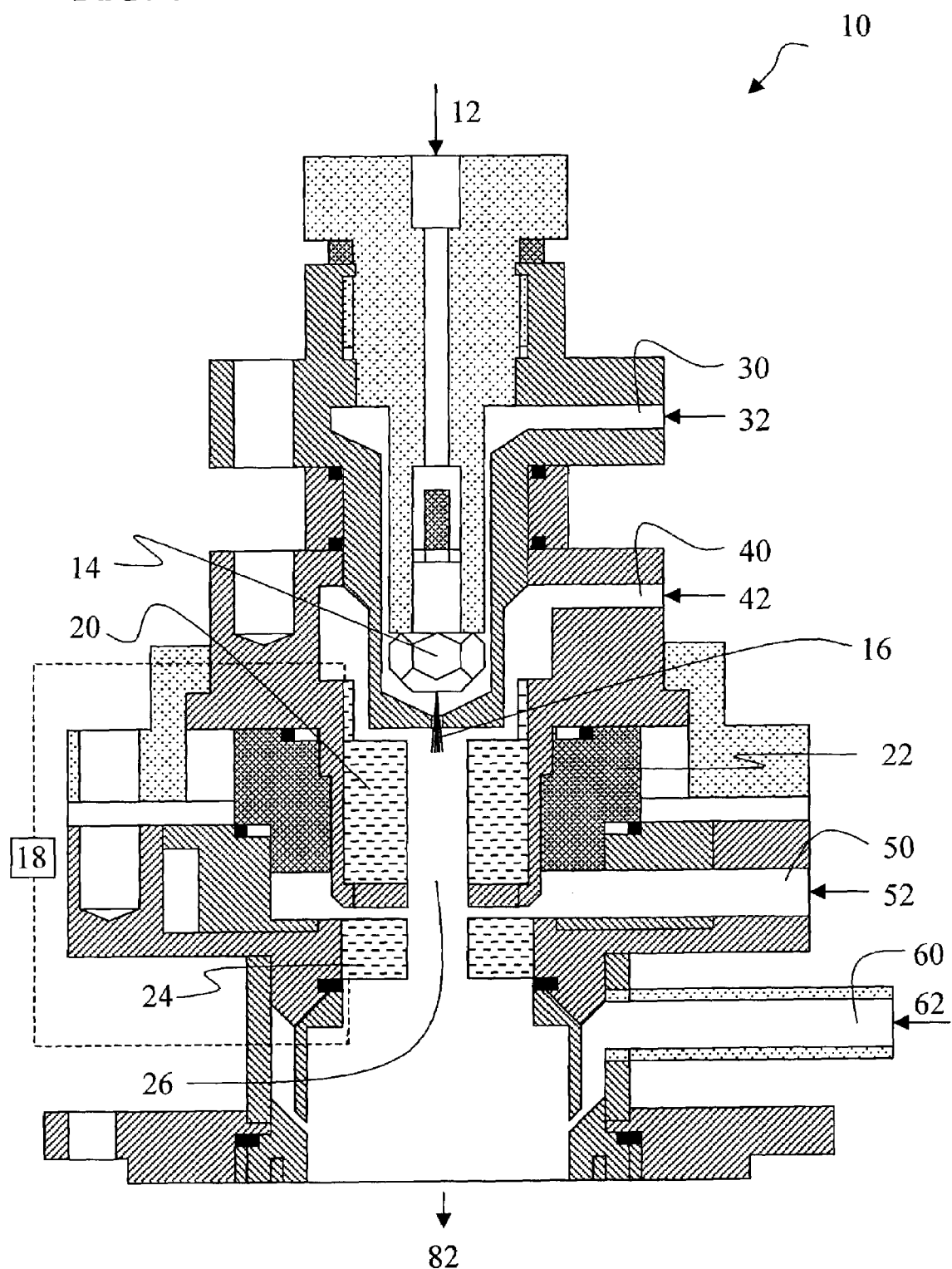
FIG. 6 is a cross-sectional illustration of a plasmatron adapted for operation with diesel fuel or other hard-to-reform liquid fuels.

FIG. 6 is a cross-sectional illustration of a plasmatron 10 adapted for operation with diesel fuel or other hard-to-reform liquid fuels. As shown, nozzle 14 has a smaller orifice diameter than that of a gasoline plasmatron. Further, electrodes 20 and 24 have decreased inner diameters and the distance between the electrode gap and the bottom electrode 24 is decreased, resulting in a plasma discharge region 26 having decreased volume. (Compare, for example, FIG. 1).

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A plasmatron fuel converter for producing a hydrogen rich gas, comprising:
    a first electrode having an electrically conductive structure;
    a second electrode disposed with respect to the first electrode to create at least two boundaries of a plasma discharge region;
    a power supply connected to the first and second electrodes to provide voltage and current sufficient to generate a plasma discharge within the discharge region to initiate a reaction of a reactive mixture;
    at least two flow establishing means for establishing at least two fluid flows in addition to said reactive mixture in a vicinity of said plasma discharge region;
    means for establishing a plasma shaping fluid flow to continually stretch and extinguish the plasma discharge generated within said plasma discharge region; and
    a control assembly connected to said at least two flow establishing means that controls said at least two fluid flows, wherein said control assembly provides decoupled flow control of each flow of said at least two fluid flows.

2. The plasmatron fuel converter of claim 1, wherein said at least two flow establishing means comprise:
    means for establishing a wall protection fluid flow for protecting said first and second electrodes.

3. The plasmatron fuel converter of claim 1, wherein said at least two flow establishing means comprise:
    means for establishing a downstream mixing fluid flow for creating turbulence in an ignited reactive mixture exiting from said plasma discharge region.

4. The plasmatron fuel converter of claim 1, wherein said at least two flow establishing means comprise:
    means for establishing a fuel atomization fluid flow.

5. The plasmatron fuel converter of claim 1, wherein said at least two flow establishing means comprise:
    means for establishing a fuel atomization fluid flow;
    means for establishing a wall protection fluid flow for protecting said first and second electrodes; and
    means for establishing a downstream mixing fluid flow for creating turbulence in an ignited reactive mixture exiting from said plasma discharge region.

6. The plasmatron fuel converter of claim 5, wherein said means for establishing a fuel atomization fluid flow and said means for establishing a wall protection fluid flow are combined and adapted to establish a fluid flow that performs both fuel atomization and wall protection functions.

7. The plasmatron fuel converter of claim 5, wherein said fuel atomization fluid flow is held at a constant flow rate while said wall protection fluid flow and said plasma shaping fluid flow are independently varied.

8. The plasmatron fuel converter of claim 1, wherein an output reformate of said plasmatron fuel converter has a thermal power in the range of approximately 10 kW to approximately 40 kW.

9. The plasmatron fuel converter of claim 1, further comprising an injection mechanism housed within said first electrode for injecting said reactive mixture into said plasma discharge region.

10. The plasmatron fuel converter of claim 9, wherein said injection mechanism comprises:
    means for providing fuel;
    means for providing oxidant to mix with said fuel and to form a fuel/oxidant mixture; and
    a nozzle for controlling injection of said fuel/oxidant mixture into said plasma discharge region.

11. The plasmatron fuel converter of claim 10, further comprising,
    a diaphragm positioned downstream from said nozzle.

12. The plasmatron fuel converter of claim 10, wherein said nozzle is a pneumatic nozzle.

13. The plasmatron fuel converter of claim 12, further comprising a pulsed solenoid valve connected to said pneumatic nozzle wherein said pneumatic nozzle is adapted to provide a steady fuel/oxidant mixture output.

14. The plasmatron fuel converter of claim 1, wherein said at least two fluid flows comprise an oxidant.

15. The plasmatron fuel converter of claim 1, wherein said at least two fluid flows comprise a fuel/oxidant mixture.

16. The plasmatron fuel converter of claim 1, wherein said first electrode and said second electrode are cylinders positioned in a co-axial configuration.

17. The plasmatron fuel converter of claim 1 wherein an oxygen to carbon ratio of the reactive mixture is between 1.2 and 2.0.

18. The plasmatron fuel converter of claim 1 wherein an oxygen to carbon ratio of the reactive mixture is less than 1.2.

19. The plasmatron fuel converter of claim 18, wherein said oxygen to carbon ratio of the reactive mixture is approximately 1.0.

20. A plasmatron fuel converter for producing a hydrogen rich gas comprising:
    a first electrode having an electrically conductive structure;
    a second electrode disposed with respect to the first electrode to create at least two boundaries of a plasma discharge region;
    a power supply connected to the first and second electrodes to provide voltage and current sufficient to generate a plasma discharge within the discharge region to initiate a reaction of a reactive mixture; and
    at least two flow establishing means for establishing at least two fluid flows in addition to said reactive mixture in a vicinity of said plasma discharge region, wherein said at least two flow establishing means are adapted to provide each of said fluid flows with decoupled flow control, and wherein said at least two flow establishing means include means for establishing a plasma shaping fluid flow to continually stretch and extinguish the plasma discharge generated within said plasma discharge region.

21. A method of plasma fuel conversion, comprising the steps of:
    positioning a first electrode and a second electrode such that a gap exists between them and a plasma discharge region is formed;
    injecting a reactive mixture into said discharge region;

supplying power from a power supply to provide voltage and current sufficient to generate a plasma discharge within the discharge region and produce an ignited reactive mixture;

introducing at least two fluid flows in addition to said reactive mixture into a vicinity of said plasma discharge region;

introducing a plasma shaping fluid flow to continually stretch and extinguish the plasma discharge generated within said plasma discharge region; and controlling the flow of said at least two fluid flows into said vicinity of the plasma discharge region with a control assembly that provides decoupled flow control of each flow of said at least two fluid flows.

22. The method of claim 21, wherein said step of introducing at least two fluid flows comprises:

introducing a wall protection fluid flow for protecting said first and second electrodes.

23. The method of claim 21, wherein said step of introducing at least two fluid flows comprises:

introducing a downstream mixing fluid flow for creating turbulence in an ignited reactive mixture exiting from said plasma discharge region.

24. The method of claim 21, wherein said step of introducing at least two fluid flows comprises:

introducing a fuel atomization fluid flow.

25. The method of claim 21, wherein said step of introducing at least two fluid flows comprises:

introducing a fuel atomization fluid flow;

introducing a wall protection fluid flow for protecting said first and second electrodes; and introducing a downstream mixing fluid flow for creating turbulence in an ignited reactive mixture exiting from said plasma discharge region.

26. The method of claim 25, wherein said fuel atomization fluid flow and said wall protection fluid flow are combined and introduced as a fluid flow that performs both fuel atomization and wall protection functions.

27. The method of claim 21, wherein said at least two fluid flows comprise an oxidant.

28. The method of claim 21, wherein said at least two fluid flows comprise a fuel/oxidant mixture.

29. The method of claim 21, wherein said reactive mixture comprises a fuel/oxidant mixture.

30. The method of claim 21, wherein said reactive mixture comprises fuel.

31. The method of claim 21, wherein an oxygen to carbon ratio of the reactive mixture is between 1.2 and 2.0.

32. The method of claim 21, wherein an oxygen to carbon ratio of the reactive mixture is less than 1.2.

33. The method of claim 32, wherein said oxygen to carbon ratio of the reactive mixture approximately 1.0.

34. The method of claim 21, further comprising the step of positioning a diaphragm downstream from said nozzle for creating turbulence in an upstream vicinity of said plasma discharge region.

35. The method of claim 21, further comprising the step of utilizing low pressure air assist with a pneumatic nozzle.

36. The method of claim 35, wherein said pneumatic nozzle comprises a pulse solenoid valve.

37. A method of plasma fuel conversion, comprising:

positioning a first electrode and a second electrode such that a gap exists between them and a plasma discharge region is formed;

injecting a reactive mixture into said discharge region;

supplying power from a power supply to provide voltage and current sufficient to generate a plasma discharge within the discharge region and produce an ignited reactive mixture; and introducing at least two fluid flows in addition to said reactive mixture into a vicinity of said plasma discharge region, wherein said at least two fluid flows have decoupled flow control, and wherein said step of introducing at least two fluid flows includes introducing a plasma shaping fluid flow to continually stretch and extinguish the plasma discharge generated within said plasma discharge region.

* * * * *